(12) United States Patent
Peeke

(10) Patent No.: US 7,472,210 B2
(45) Date of Patent: Dec. 30, 2008

(54) MULTIPLEXING AND BYPASS CIRCUIT FOR INTERFACING EITHER SINGLE OR DUAL PORTED DRIVES TO MULTIPLE STORAGE PROCESSORS

(75) Inventor: Douglas E. Peeke, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 575 days.

(21) Appl. No.: 11/167,884

(22) Filed: Jun. 27, 2005

(65) Prior Publication Data

US 2006/0294266 A1    Dec. 28, 2006

(51) Int. Cl.
  *G06F 3/00*   (2006.01)
  *G06F 5/00*   (2006.01)
  *G08C 15/00*  (2006.01)
  *H04L 12/00*  (2006.01)

(52) U.S. Cl. .............. 710/51; 710/36; 710/37; 710/38; 370/221; 370/351

(58) Field of Classification Search ........... 710/51, 710/36, 38, 37; 370/221, 351
See application file for complete search history.

(56) References Cited

U.S. PATENT DOCUMENTS

| | | | |
|---|---|---|---|
| 2004/0044802 A1* | 3/2004 | Chiang et al. ............ 710/1 |
| 2004/0081179 A1 | 4/2004 | Gregorcyk, Jr. .......... 370/402 |
| 2004/0199515 A1* | 10/2004 | Penny et al. ............. 707/10 |
| 2005/0027920 A1* | 2/2005 | Fitzsimmons et al. ..... 710/317 |
| 2005/0182874 A1* | 8/2005 | Herz et al. ............. 710/74 |
| 2005/0228943 A1* | 10/2005 | DeCenzo et al. ......... 711/114 |
| 2005/0251588 A1 | 11/2005 | Hoch et al. ............. 710/5 |
| 2005/0273530 A1 | 12/2005 | Tseng .................... 710/62 |
| 2006/0103966 A1 | 5/2006 | Georgis ................. 360/69 |
| 2006/0195881 A1 | 8/2006 | Segev et al. ........... 725/116 |
| 2006/0253676 A1* | 11/2006 | Tanaka et al. .......... 711/168 |

* cited by examiner

*Primary Examiner*—Niketa I Patel
(74) *Attorney, Agent, or Firm*—BainwoodHuang

(57) ABSTRACT

Single and dual ported devices are interfaced to a system via a 2:2 multiplexing device. The multiplexing device is coupled to two system ports and two device ports. The multiplexing device includes an active multiplexer coupled to the two system ports and a multiplexed port. The multiplexing device also includes bypass circuitry coupled to the two system ports and two bypass ports. In operation, when the multiplexing device is coupled via one of the device ports to a single ported device such as a single ported disk drive, the active multiplexer is activated and the bypass circuitry is deactivated and the multiplexed port is coupled to the device port. When the multiplexing device is coupled via both device ports to a dual ported device, the active multiplexer is deactivated and the bypass circuitry is activated and the bypass ports are coupled to the two device ports.

24 Claims, 13 Drawing Sheets

MULTIPLEXING AND BYPASS CIRCUIT FOR INTERFACING EITHER SINGLE OR DUAL PORTED DRIVES TO MULTIPLE STORAGE PROCESSORS

FIELD OF THE INVENTION

The present invention relates generally to the field of storage systems, and particularly to a multiplexing device for use with more than one type of disk drive.

BACKGROUND OF THE INVENTION

Today's enterprise data centers store ever larger amounts of business critical data that must be immediately available and highly reliable. The data is also backed up or archived in large volumes and accessed periodically. To achieve reliability and performance goals for critical data, it is preferable to employ dual ported disk drives such as Fibre Channel or SAS (Serial Attached SCSI) drives in a highly available storage system that employs multiple storage processors or controllers, as this architecture provides the highest performance and reliability. But single ported disk drives, such as SATA (Serial Advanced Technology Attachment) drives, are less costly and provide greater capacity, making them ideal for online storage of backup or archived data. It is desirable for a storage system to be able to support either type of drive—dual or single ported—so that the user's system can be customized to optimize storage performance, capacity, reliability, and cost, as the user's applications require.

To date, in order to employ single ported drives such as SATA drives in a highly available storage system employing multiple storage processors or controllers, 2:1 multiplexers or switches have been employed as interfaces between the single SATA port and the multiple controllers. But it is difficult to integrate both types of drives—single and dual ported—into a single system without increasing software and hardware complexity. What is needed is a device for interfacing either single or dual ported drives to multiple storage processors or controllers without adding system complexity.

SUMMARY OF THE INVENTION

In accordance with the principles of the invention, single and dual ported devices are interfaced to a system via a single 2:2 multiplexing device. The multiplexing device is coupled to two system ports and two device ports. The multiplexing device includes an active multiplexer coupled to the two system ports and a multiplexed port. The multiplexing device also includes bypass circuitry coupled to the two system ports and to two bypass ports. In operation, when the multiplexing device is coupled via one of the device ports to a single ported device such as a single ported disk drive, the active multiplexer is activated and the bypass circuitry is deactivated, and the multiplexed port is coupled to the device port. This configuration is advantageous for supporting SATA disk drives in a highly available storage system. When the multiplexing device is coupled via both device ports to a dual ported device, the active multiplexer is deactivated and the bypass circuitry is activated, and the bypass ports are coupled to the two device ports. This configuration is advantageous for supporting SAS disk drives in a highly available storage system. The 2:2 multiplexing device of the invention thus enables the interfacing of either single or dual ported disk drives to multiple storage processors or controllers in a highly flexible arrangement without adding system hardware and software complexity.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
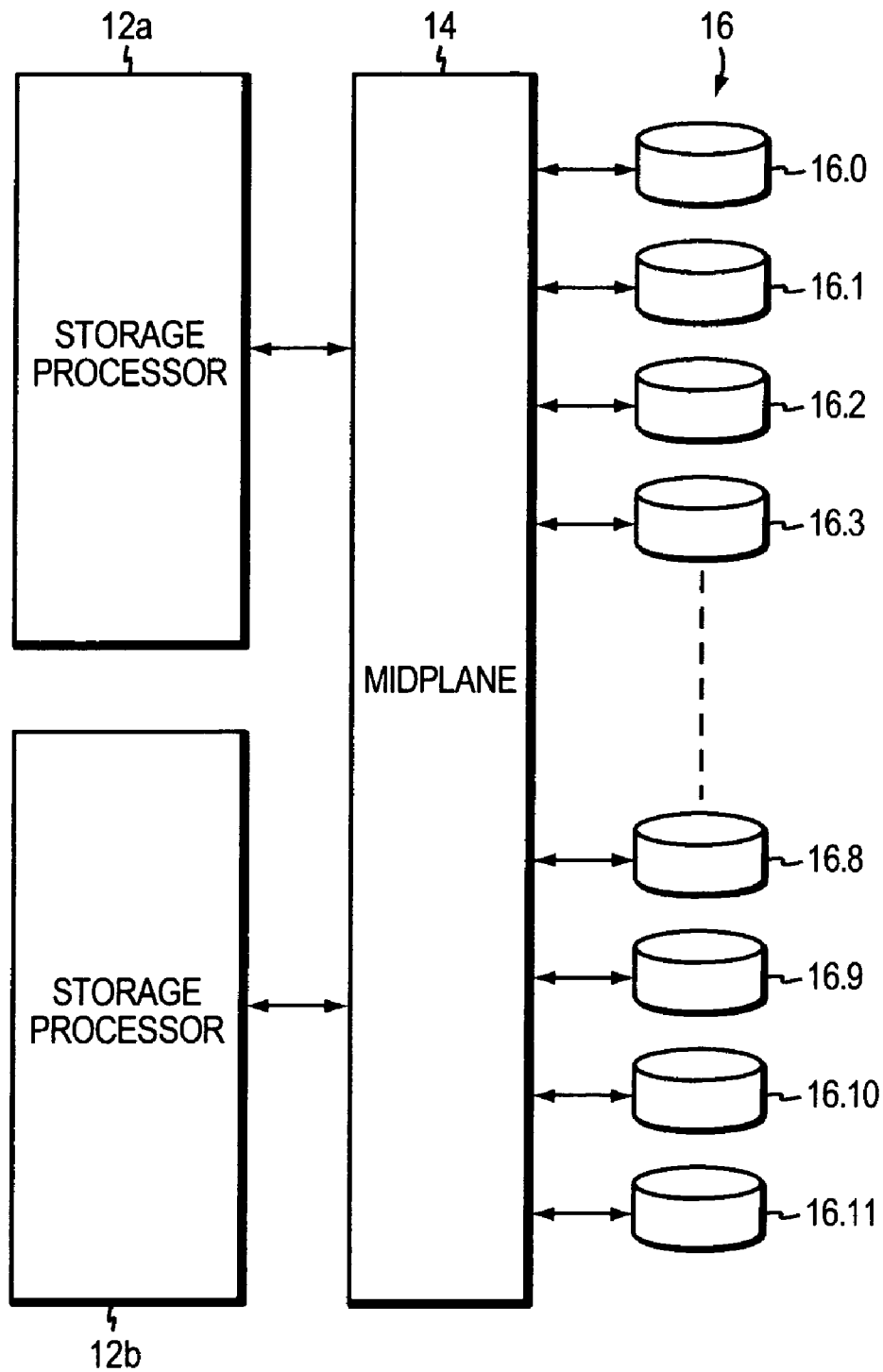
FIG. 1 is a representation of a storage system including dual storage processors coupled to disk drives via a midplane.

In FIG. 1 there is shown a functional block diagram of an exemplary storage system 10 in which the invention can be implemented. The storage system 10 includes two redundant storage processors 12a and 12b to provide high availability of the system. The storage processors 12a,b are coupled to a midplane 14. Disk drives 16, herein shown as 12 disk drives 16.0-16.11, are also coupled to the midplane 14. Each storage processor 12a,b communicates with all the drives 16.0-16.11 via the midplane 14. Multiple storage systems 10 can be coupled together to make a larger storage system.

Figure 2:
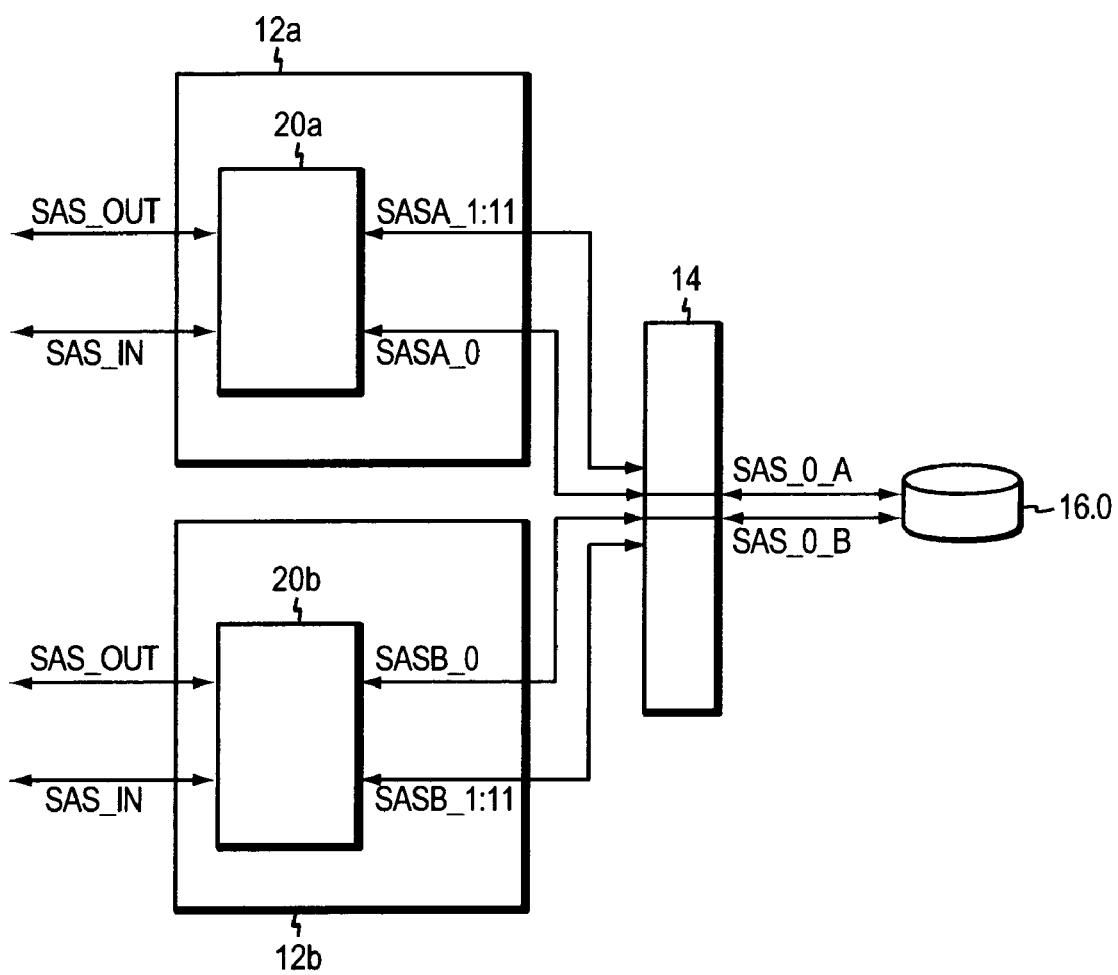
FIG. 2 is a schematic representation showing the connection of the storage processors of FIG. 1 to a dual ported SAS disk drive.

In certain storage systems, the disk drives 16 are dual ported so that they can be accessed by either the storage processor 12a or 12b. Such disk drives 16 may be for example Fibre Channel (FC) disk drives or Serial Attached SCSI (SAS) disk drives. In FIG. 2 there is shown an example of how a SAS dual ported disk drive 16, for example 16.0, is coupled to the storage processors 12a and 12b in such systems. As shown, each storage processor 12a,b includes a SAS expander 20a,b respectively. The SAS expander 20a receives SAS_in signals, consisting of source SAS serial transmit and receive signals, or, in an enclosure of multiple systems, SAS signals received from a previous system 10. The SAS expander 20a can also be coupled via SAS_out signals to a SAS_in port of another enclosure. The SAS_in signal is expanded by the expander 20a to 12 sets of signals SASA_0:11. Each of the 12 SASA_0:11 signal sets consists of a pair of transmit and receive signals, thus each SASA_0:11 signal is shown in the Figure as a bidirectional bus. SASA_0 is shown separate from the other 11 signals for clarity. The SASA_0 signal set is coupled via the midplane 14 to one port of the dual ported SAS disk drive 16.0. The expander 20b also receives the SAS_in signals, and may also be coupled to another enclosure via the SAS_out port. The SAS_in signals are expanded by the expander 20b to 12 signals SASB_0:11. Again, SASB_0 is shown separate from the other 11 signals for clarity. The SASB_0 signal set is coupled via the midplane 14 to the other port of the dual ported SAS disk drive 16.0. The other drives 16.1-16.11 are coupled to the expander 20a in the same manner. Thus, each storage processor 12a,b has its own connection to each disk drive 16.

Figure 3:
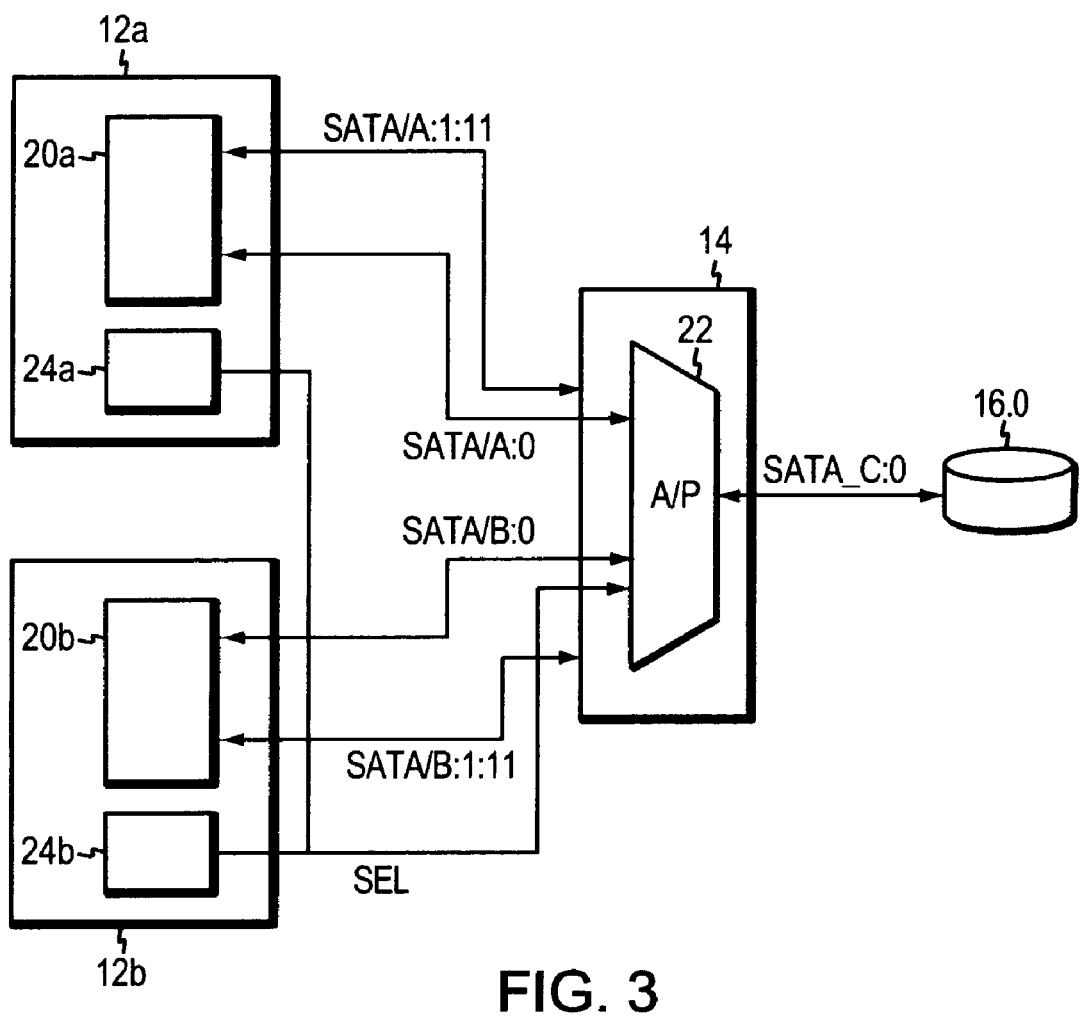
FIG. 3 is a schematic representation showing the connection of the storage processors of FIG. 1 to a single ported SATA disk drive, wherein a 2:1 active/passive or passive/passive multiplexer is employed on the midplane.

In an alternate embodiment, the disk drives 16.0-16.11 are single ported. Such disk drives 16 may be for example SATA drives. In order to use a single-ported SATA drive in a highly available system such as that of FIG. 1, it is necessary to implement a mechanism for allowing either of the storage processors 12a,b to access the SATA drive. In accordance with one implementation, as shown in FIG. 3, the expanders 20a,b now expand SATA signals (which may be transported via a particular SAS protocol). Again, the SATA signals consist of transmit/receive pairs and are thus shown as bi-directional. A 2:1 multiplexer or switch 22 is coupled between the storage processors 12a,b and each disk drive 16 (1 drive 16.0 herein shown). In FIG. 3 the multiplexer 22 is what is known either as an "active/passive" or "passive/passive" multiplexer. An active/passive multiplexer is shown. The storage processor 12a SATA port signals for the drive 16.0, labeled SATA/A:0, are connected to the multiplexer 22. The other SATA signal sets SATA/A:1:11 are coupled to the drives 16.1-16.11 in the same manner and thus these signals are not shown for clarity. The other storage processor 12b SATA port signals for the drive 16.0, labeled SATA/B:0, are also connected to the multiplexer 22. Again, the other SATA signal sets SATA/B:1:11 are coupled to the drives 16.1-16.11 in the same manner and thus these signals are not shown for clarity. The multiplexer port signals, labeled SATA_C:0 are connected to the SATA drive 16.0. Decision logic 24a, b on the storage processors 12a,b respectively drive a select signal SEL to control the multiplexer 22 so that one or the other storage processor 12a or 12b is connected via the multiplexer port signals SATA_C:0 of the multiplexer 22 to the single port of the SATA drive 16.0 Access to the SATA drive 16.0 is thus shared between the storage processors 12a,b. According to an alternate embodiment (not shown), the SEL signal can be a virtual wire. In other words, storage processors 12a,b can send information through the SATA/A:0 and SATA/B:0 to the multiplexer 22 to tell it to switch. Thus no external wire is required between the multiplexer 22 and the storage processors 12a,b.

Figure 4:
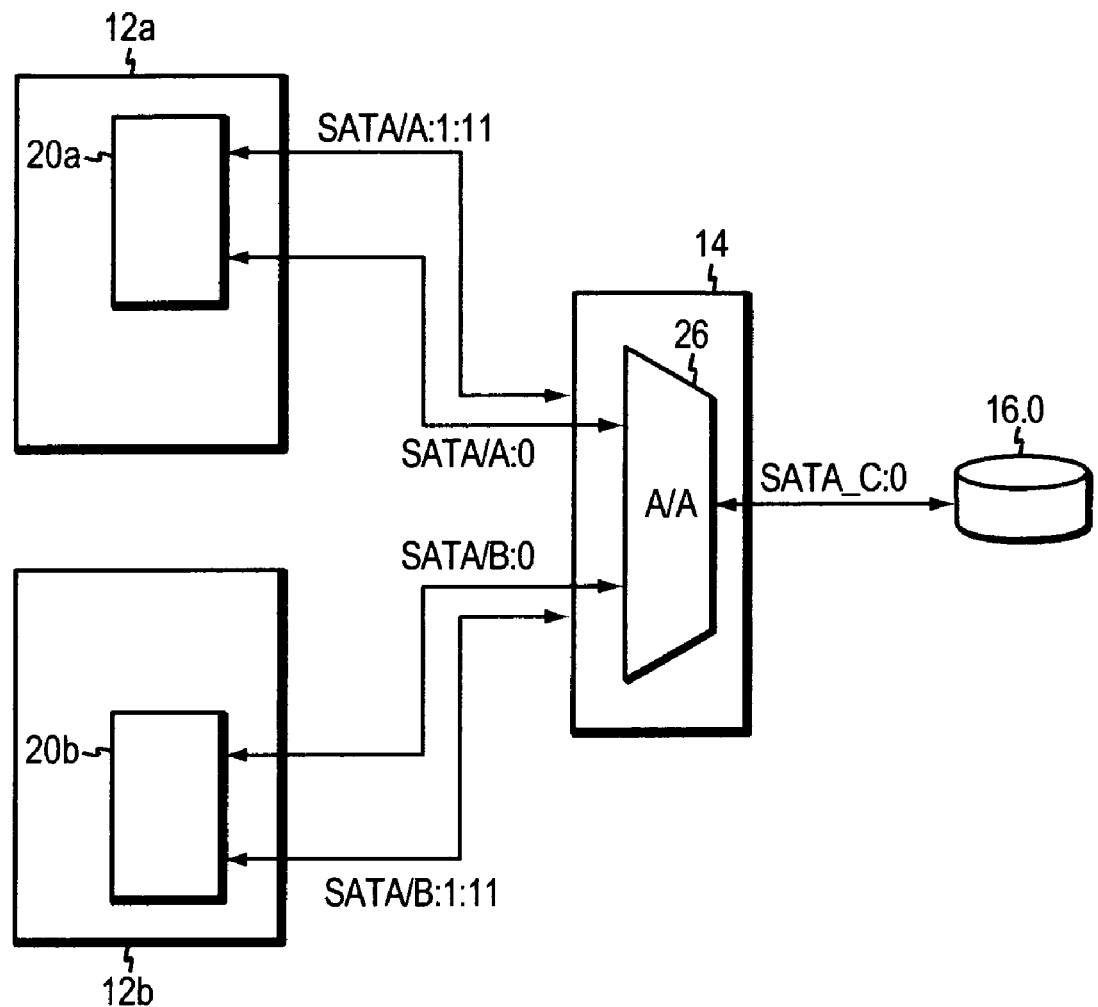
FIG. 4 is a schematic representation showing the connection of the storage processors of FIG. 1 to a single ported SATA disk drive, wherein a 2:1 active/active multiplexer is employed on the midplane.

In FIG. 4, an alternate embodiment utilizes a 2:1 multiplexer 26 of a type known as an "active/active" multiplexer. Again, each expander 20a,b is connected to the multiplexer 26. The multiplexer 26 SATA_C:0 is connected to the single ported SATA drive 16.0. (Other drives 16.1-16.11 are each connected to respective multiplexers 26 in the same manner.) The active/active multiplexer 26 employs means for causing each of the storage processors 12a, b to operate as if it is connected to its own SATA drive 16. In other words, the active/active multiplexer 26 causes each drive 16 to appear dual-ported. One known mechanism by which the active/active multiplexer works is by splitting in half the available queues on a SATA disk drive between the two storage processors, so that each storage processor sees its own drive with its own queues. The active/active multiplexer 26 is highly advantageous for use in SATA systems because it eliminates the hardware and software burdens associated with the decision logic 24a,b necessary to employ a passive/passive or active/passive multiplexer.

Dual ported drives such as SAS drives and single ported drives such as SATA drives each have their own advantages. The dual-ported nature of FC and SAS drives make them highly advantageous for use in highly available systems such as that shown in FIG. 1 because of the fault tolerance, high performance, and ease of implementation they provide. However, dual ported drives are more expensive than single ported drives and tend to provide lower capacity than single ported drives. For certain applications where very large stores of data must be maintained on line, the use of higher capacity single ported drives can be a more optimal solution. The invention realizes that it would be highly advantageous to allow the use of either dual ported or single ported drives in a storage system such as that shown in FIG. 1. One example implementation might employ 6 SAS drives and 6 SATA drives. In order to produce such an implementation, there must be a way for each storage processor 12a,b to access either a dual ported or a single ported drive.

In order for each storage processor 12a,b to access the SATA type drive 16, a multiplexer such as 22 or 26 must be employed, for example on the midplane 14, for each drive 16. It is highly preferable to implement the active/active type of multiplexer 26 because of the hardware and software efficiencies it provides. However, the active/active multiplexers currently available do not pass SAS signals. It is expensive in terms of cost, board space, and pin count to try to route SAS signals in addition to the multiplexer signals. In recognition of this problem, the invention provides a 2:2 multiplexing device having an active/active multiplexer and bypass circuitry for passing SAS signals.

Generally, the invention provides a multiplexing device for coupling to two system ports and to two device ports. The multiplexing device includes an active/active multiplexer coupled to the two system ports and a multiplexed port. The multiplexing device also includes bypass circuitry coupled to the two system ports and two bypass ports. The multiplexing device operates so that when the multiplexing device is coupled via a first of the device ports to a target device that is a single ported device, the bypass circuitry is deactivated and the active multiplexer is activated to multiplex between the two system ports and the multiplexed port. The multiplexed port is then coupled to the target device via the first device port. Alternately, when the multiplexing device is coupled via the two device ports to a target device that is a dual ported device, the active multiplexer is deactivated and the bypass circuitry is activated and both of the bypass ports are coupled to the system ports.

Figure 5:
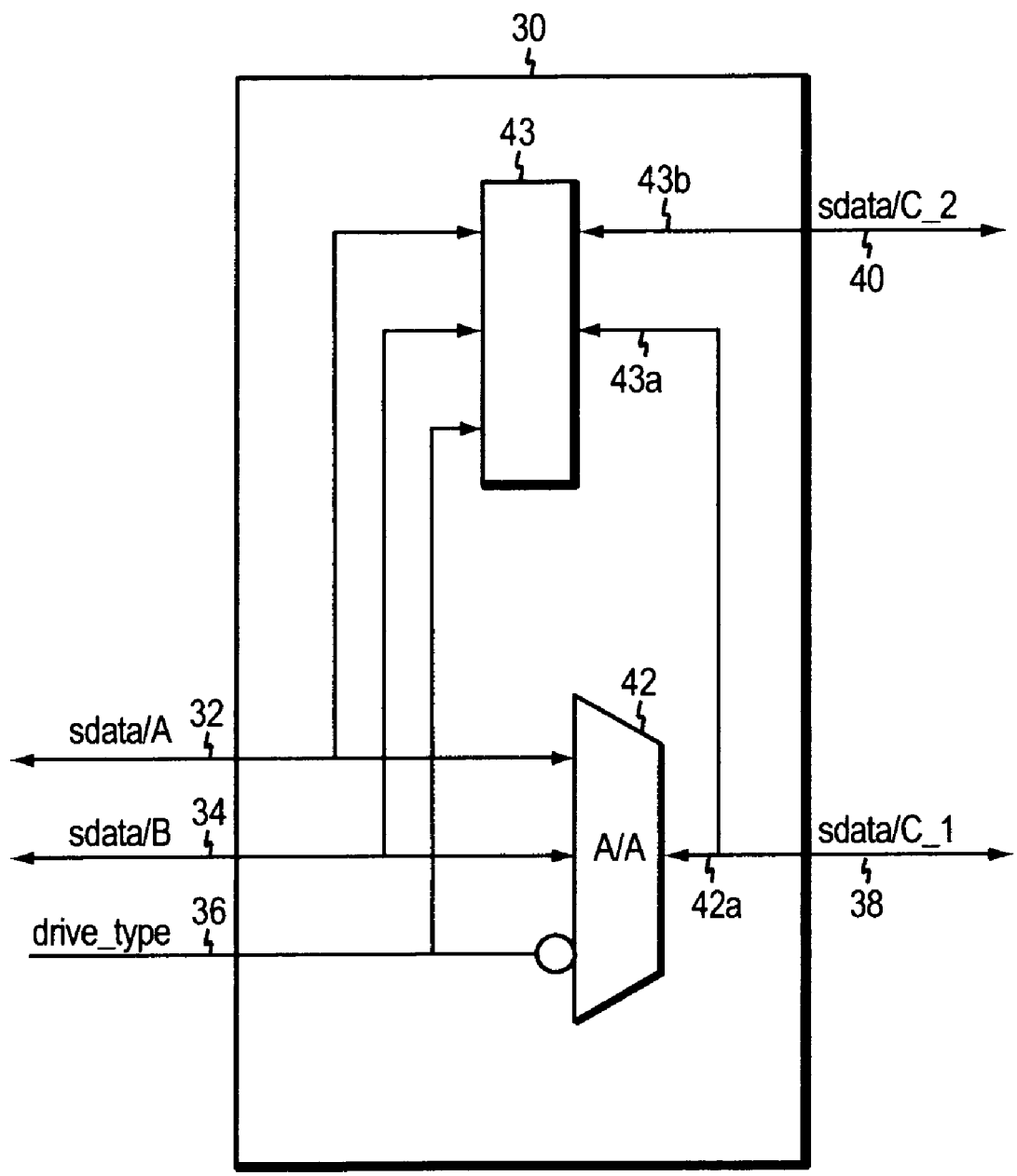
FIG. 5 is a schematic representation of a 2:2 multiplexing device of the invention.

In a storage system environment, the system ports are coupled between the storage processors and the multiplexing device. The target device is either a single or dual ported disk drive. Referring now to FIG. 5, there is shown a 2:2 multiplexing device 30 in accordance with the principles of the invention. Again, single and dual-ported signals consist of transmit/receive pairs and are thus shown as bi-directional.

The multiplexing device 30 is coupled via system ports 32 and 34 to the system port signals sdata/A from the storage processor 12a and sdata/B from the storage processor 12b. Also accepted as input is a select signal 36, herein labeled "drive_type". The multiplexing device 30 is coupled to the device port signals sdata/C_1 and sdata/C_2 on device ports 38 and 40 respectively. The device port signals sdata/C_1 (38) and sdata/C_2 are for coupling to a target device, which for purposes of this description is a disk drive. The multiplexing device 30 includes an active/active multiplexer 42 and bypass circuitry 43. The system port signals sdata/A and sdata/B on system ports 32 and 34 are coupled to the active/active multiplexer 42. The multiplexer 42 mux port signal 42a is coupled to the device port signal sdata/C_1. The signals sdata/A and sdata/B are also coupled to the bypass circuitry 43. The bypass ports 43a and 43b of the bypass circuitry 43 are coupled to the sdata/C_1 and sdata/C_2 device port signals.

Figure 6:
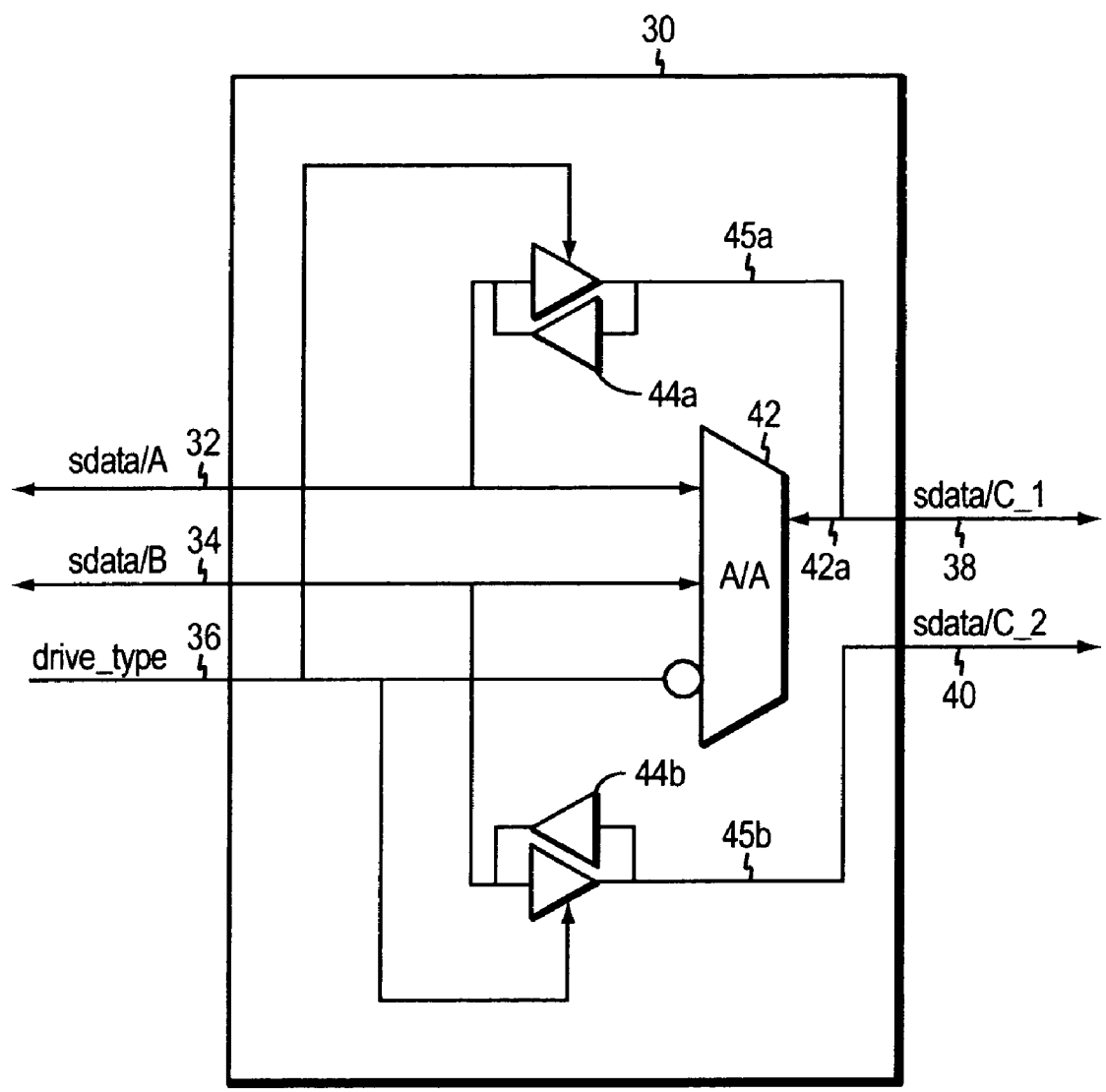
FIG. 6 is a schematic representation of the 2:2 multiplexing device of the invention showing an implementation of the bypass circuitry.

Referring now to FIG. 6, there is shown an implementation of the multiplexing device of FIG. 5 wherein the bypass circuitry 43 is composed of high impedance drivers 44a and 44b. The system port signals sdata/A and sdata/B are coupled to the drivers 44a and 44b respectively. The bypass port 45a of the driver 44a is coupled to the sdata/C_1 device port signal, as is the multiplexer mux port signal 42a. The bypass port 45b of the driver 44b is coupled to the sdata/C_2 device port signal.

In one embodiment, when a disk drive 16 is plugged into the system 10, it drives the drive_type signal 36 to indicate whether it is a single ported drive or a dual ported drive. Insertion of a single ported drive will drive the drive_type signal 36 to a first logical level, such as logical "0". Insertion of a dual ported drive will drive the drive_type signal 36 to a second logical level, such as a logical "1". (Those skilled in the art will understand that intervening logic may translate identification signals from the drives into the drive_type signal.)

Figure 7:
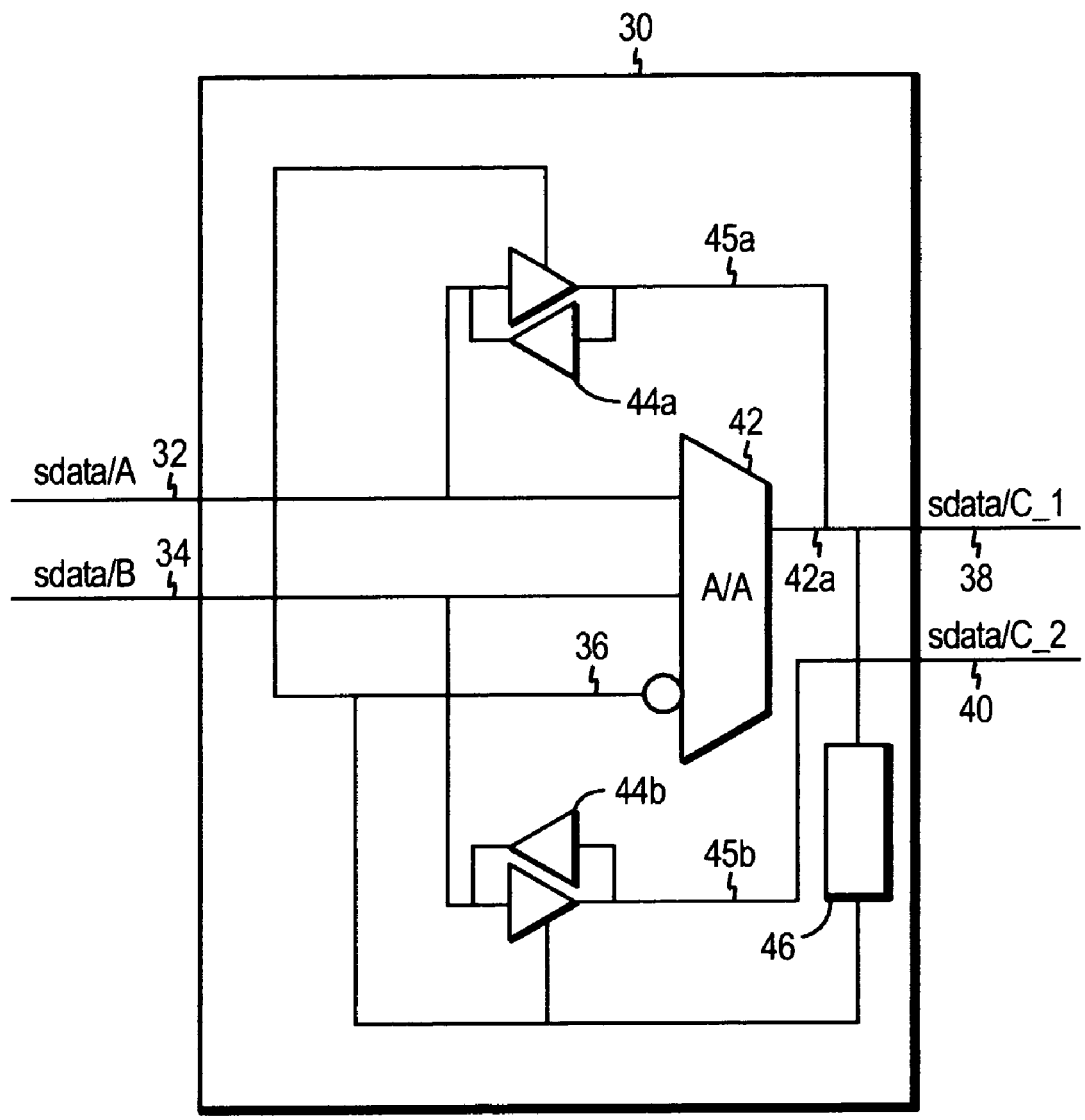
FIG. 7 is a schematic representation of an alternate embodiment of the 2:2 multiplexing device of the invention.

In an application particularly implementing SATA and/or SAS drives, the multiplexer 30 can establish communications with the drive in a known manner over the SATA and/or SAS signals. The protocol to establish communication is defined so that the system can establish if it is connected to a SATA or to a SAS drive. Thus the multiplexer knows what type of drive it is attached to and can drive its drive_type signal internally. In the example of FIG. 7, the multiplexer 30 is functionally shown to include select logic 46 for generating an internal drive_type signal 36 from one of the sdata/C signals.

Figure 8:
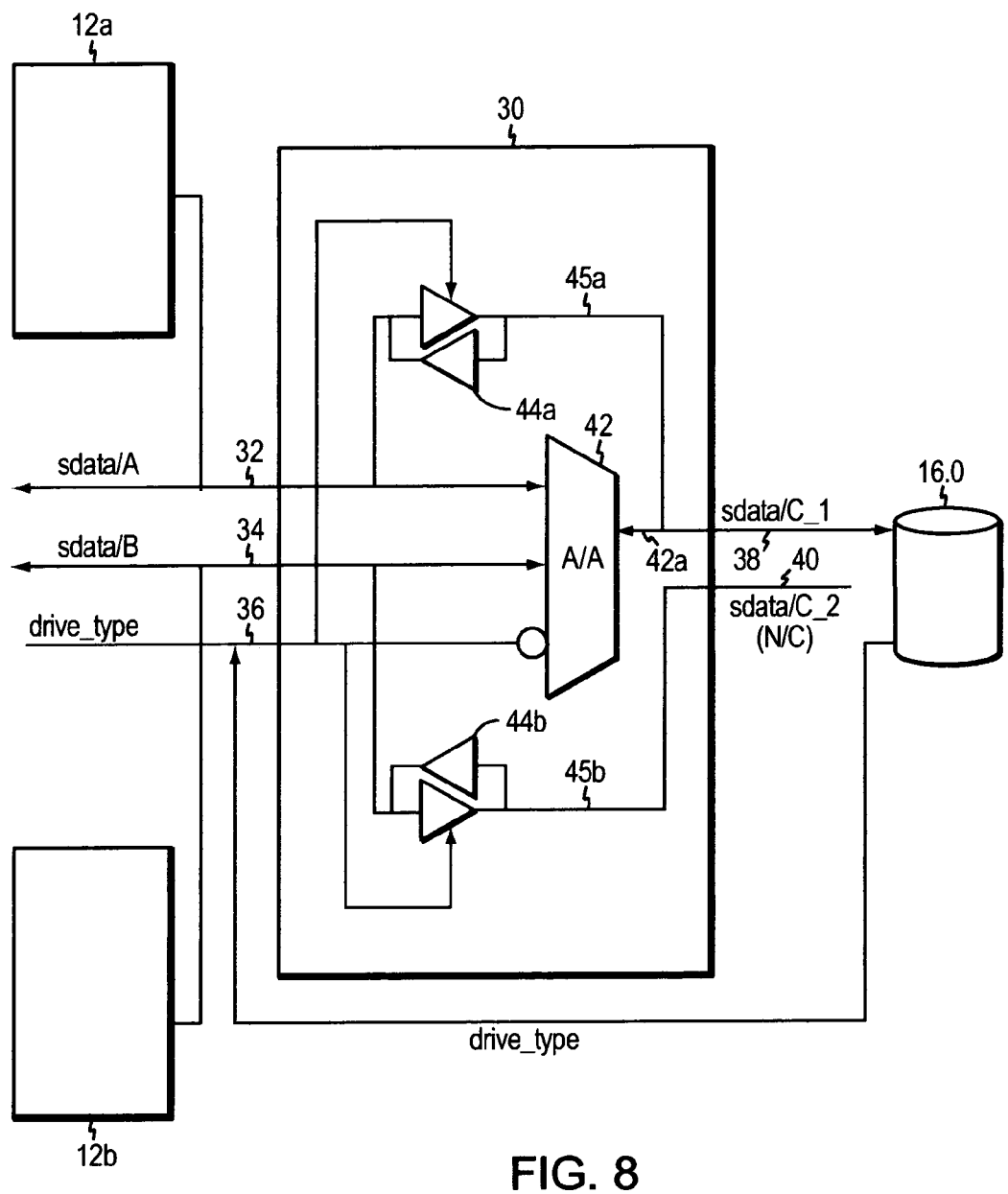
FIG. 8 is a schematic representation of the use of the multiplexing device of FIG. 6 with a single ported disk drive.

The multiplexing device 30 as implemented in a storage system generally operates as follows. When a single ported drive 16 is plugged in, as shown in FIG. 8, the drive_type signal 36 is driven to a first logical state, for example logical "0". The drive_type signal input to the multiplexer 30 activates the active/active multiplexer 42 and deactivates the drivers 44a and 44b. The deactivated drivers 44a and 44b place their outputs in a high impedance state. The activated multiplexer 42 multiplexes the system port signals sdata/A and sdata/B onto the mux port signal sdata/C_1. The active/active multiplexer 42 employs means for making the single mux port signal sdata/C_1 appear as a dual ported, as previously described. The sdata/C_2 signal is unused and is thus shown unconnected (N/C). When writing to the single ported drive, the signals sdata/A and sdata/B are multiplexed by the multiplexer 42 to write data to the drive via the sdata/C signal. When reading from the drive, the sdata/C signal is directed via the multiplexer 42 to one of the signals sdata/A or sdata/B and on to the storage processors 12a or 12b.

Figure 9:
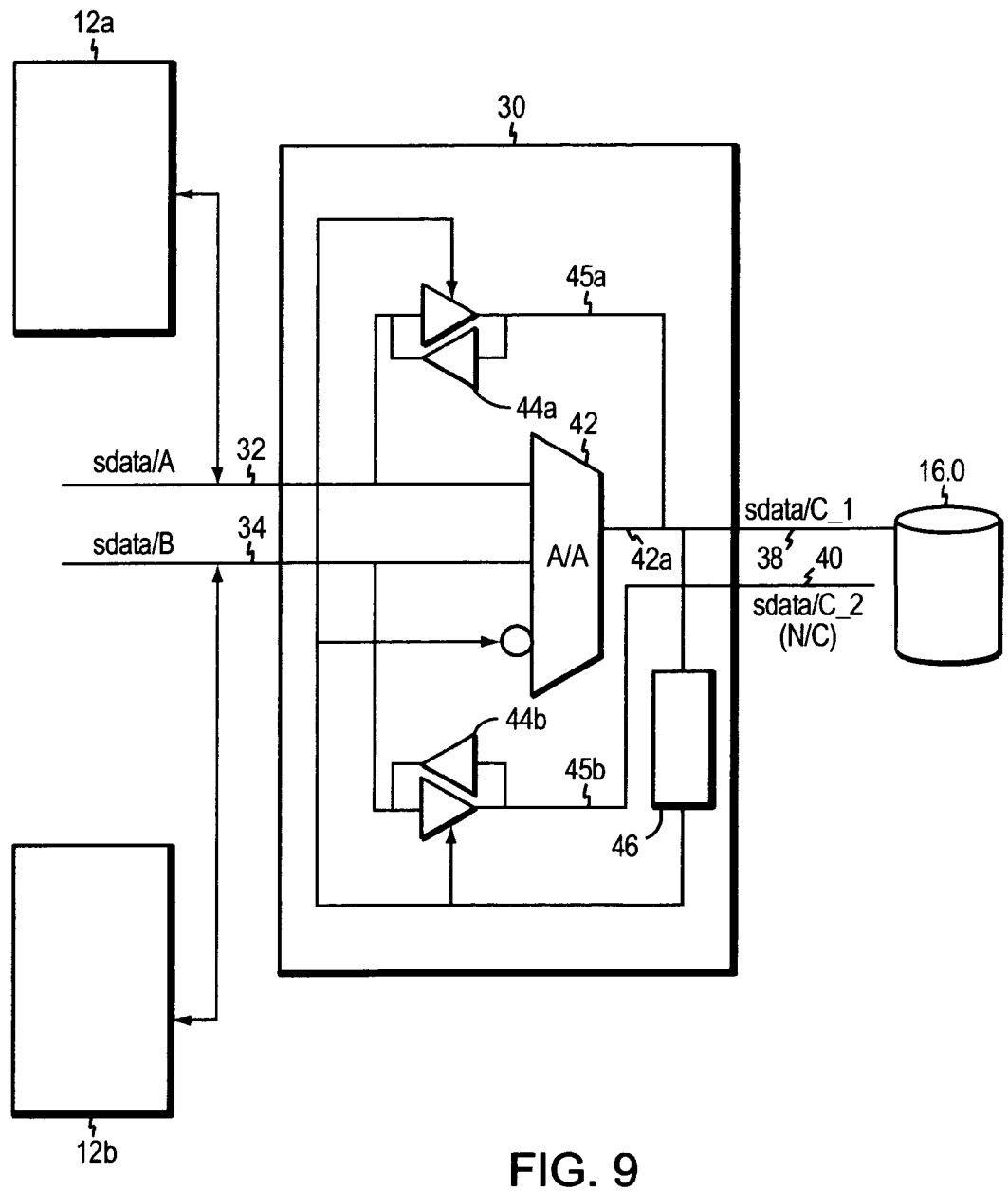
FIG. 9 is a schematic representation of the use of the multiplexing device of FIG. 7 with a single ported SATA disk drive.

In the particular case where the multiplexer 30 is coupled to a SATA single port disk drive, the multiplexer 30 of FIG. 7 can be employed as shown in FIG. 9. The embodiment of FIG. 9 functions in the same manner as the embodiment of FIG. 8, except that FIG. 9 takes advantage of the SAS/SATA protocol to generate the drive_type select signal 36 internal to the multiplexer 30 as previously described.

Figure 10:
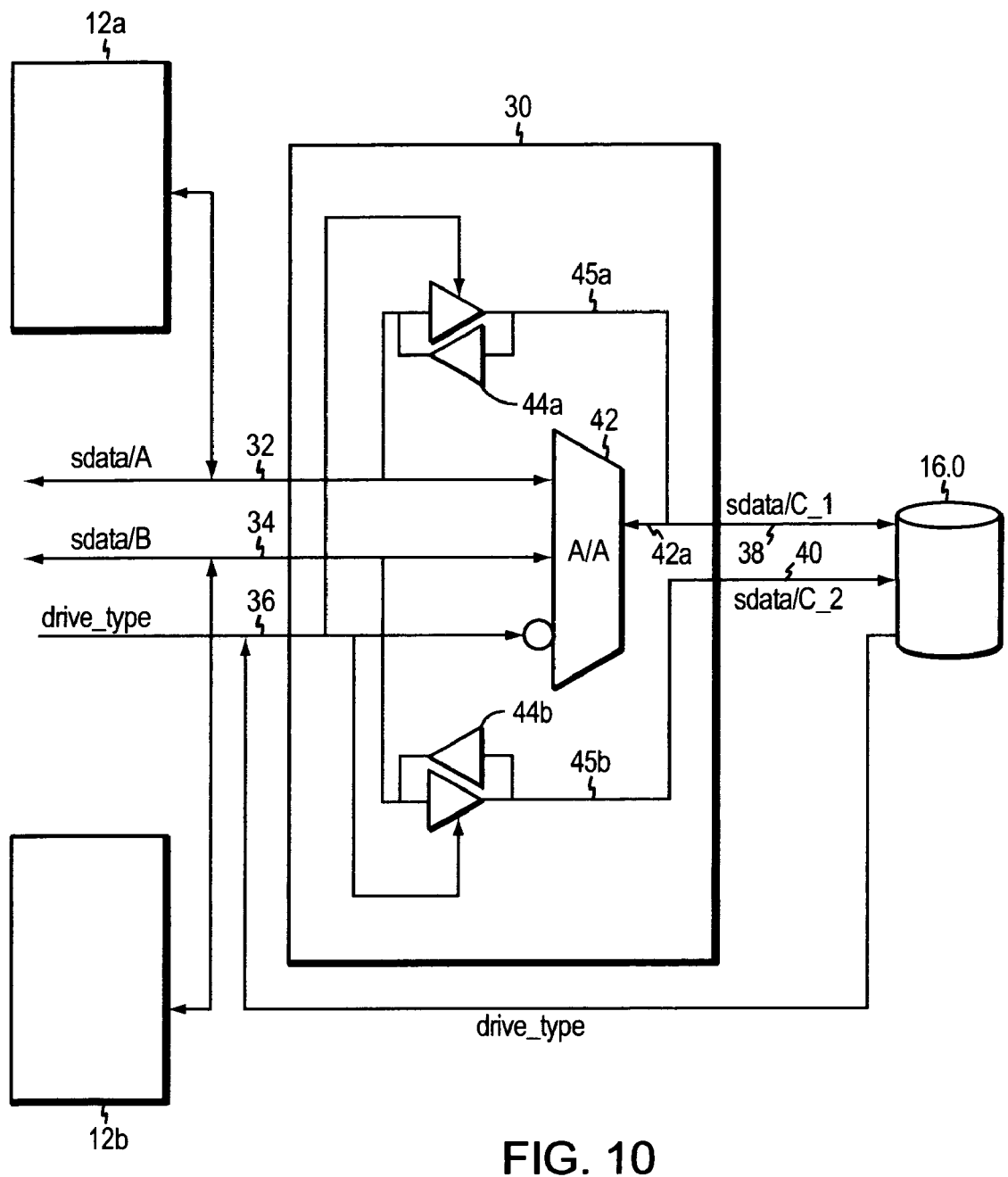
FIG. 10 is a schematic representation of the use of the multiplexing device of FIG. 6 with a dual ported disk drive.

When a dual ported drive is plugged into the system, as shown in FIG. 10, the drive_type signal 36 is driven to a second logical state, for example logical "1". In this case, the drive_type signal 36 deactivates the active/active multiplexer 42. In its disabled state, the multiplexer 42 in a high impedance state; in other words, the multiplexer 42 does not drive the sdata/C_1, sdata/C_2, sdata/A, or sdata/B signals. Drivers 44a and 44b are activated by the drive_type signal 36, so that the system port signals sdata/A and sdata/B are coupled to the bypass ports 45a,b and thus to the device port sdata/C_1 and sdata/C_2 signals respectively. Each storage processor thereby has its own connection to the drive 16.

Figure 11:
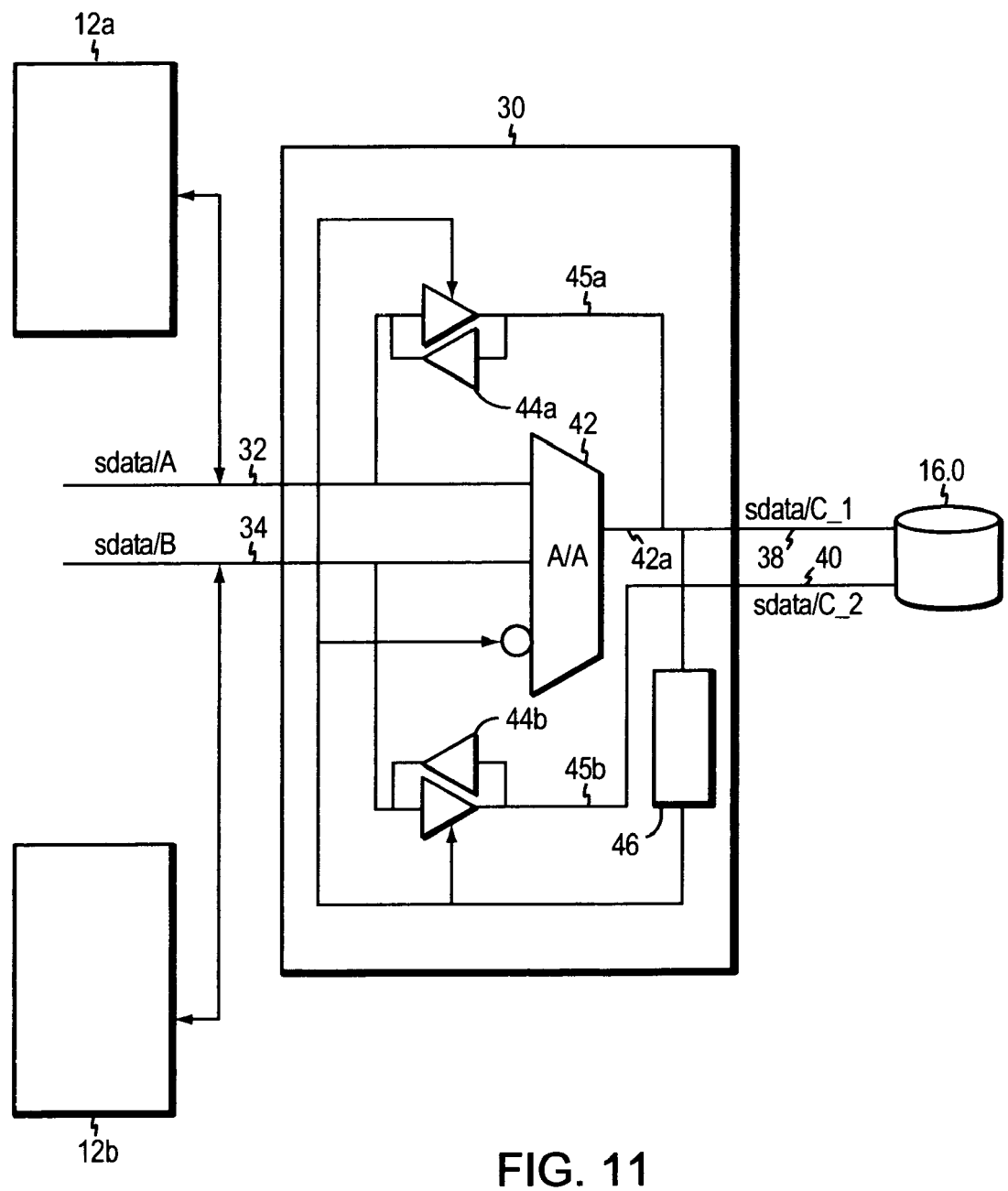
FIG. 11 is a schematic representation of the use of the multiplexing device of FIG. 7 with a dual ported SAS disk drive.

In the particular case where the multiplexer 30 is coupled to a SAS dual ported disk drive 16, the multiplexer 30 of FIG. 7 can be employed as shown in FIG. 11. The embodiment of FIG. 11 functions in the same manner as the embodiment of FIG. 10, except that FIG. 11 takes advantage of the SAS/SATA protocol to generate the drive_type select signal 36 internal to the multiplexer 30 as previously described.

Figure 12:
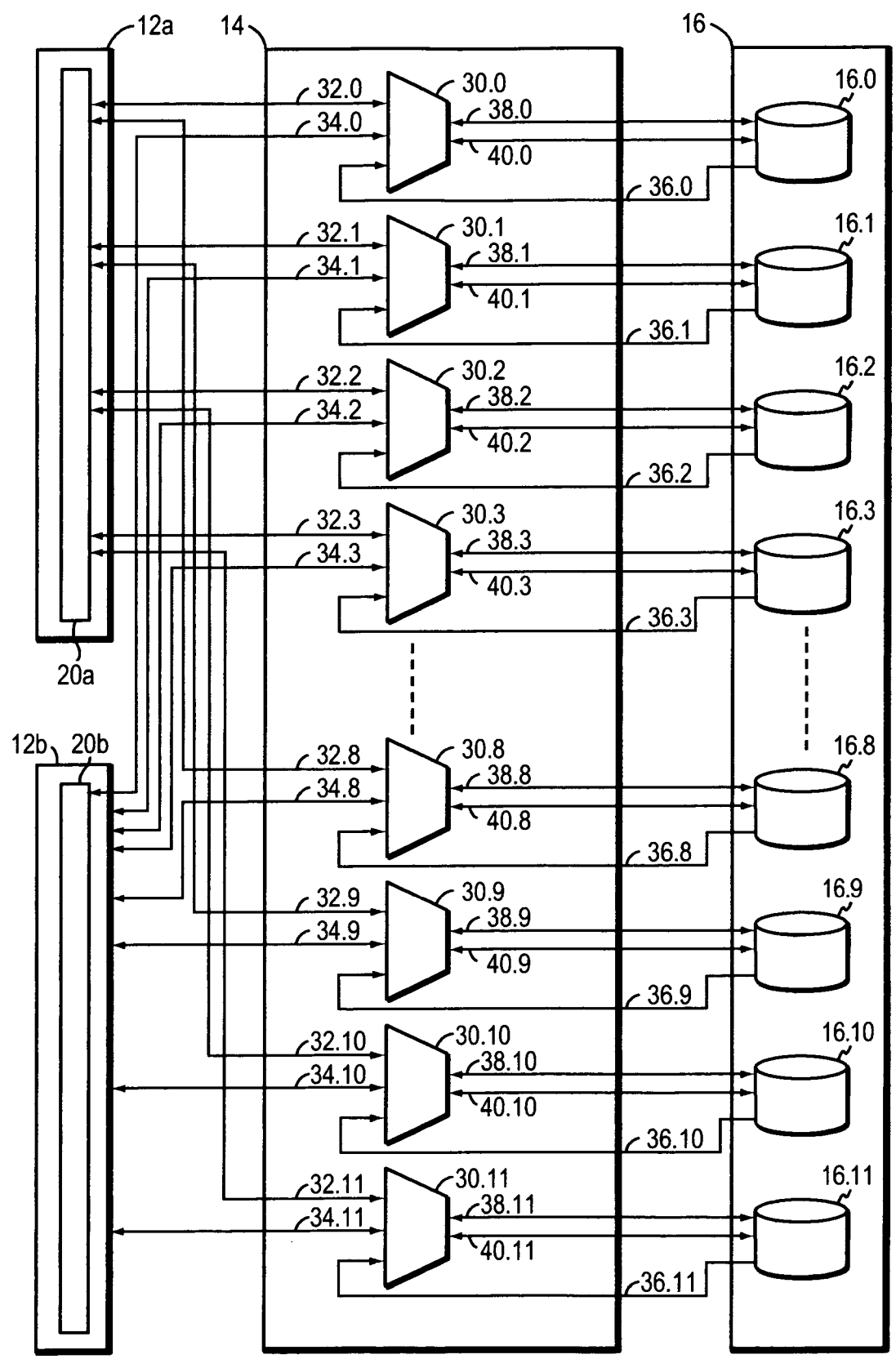
FIG. 12 is a schematic representation of a storage system like that of FIG. 1 wherein the midplane employs a multiplexing device as shown in FIGS. 8 and 10 for each disk drive installed in the system, so that the storage processors can communicate with either a dual ported or single ported disk drive on a slot-by-slot basis.
Figure 13:
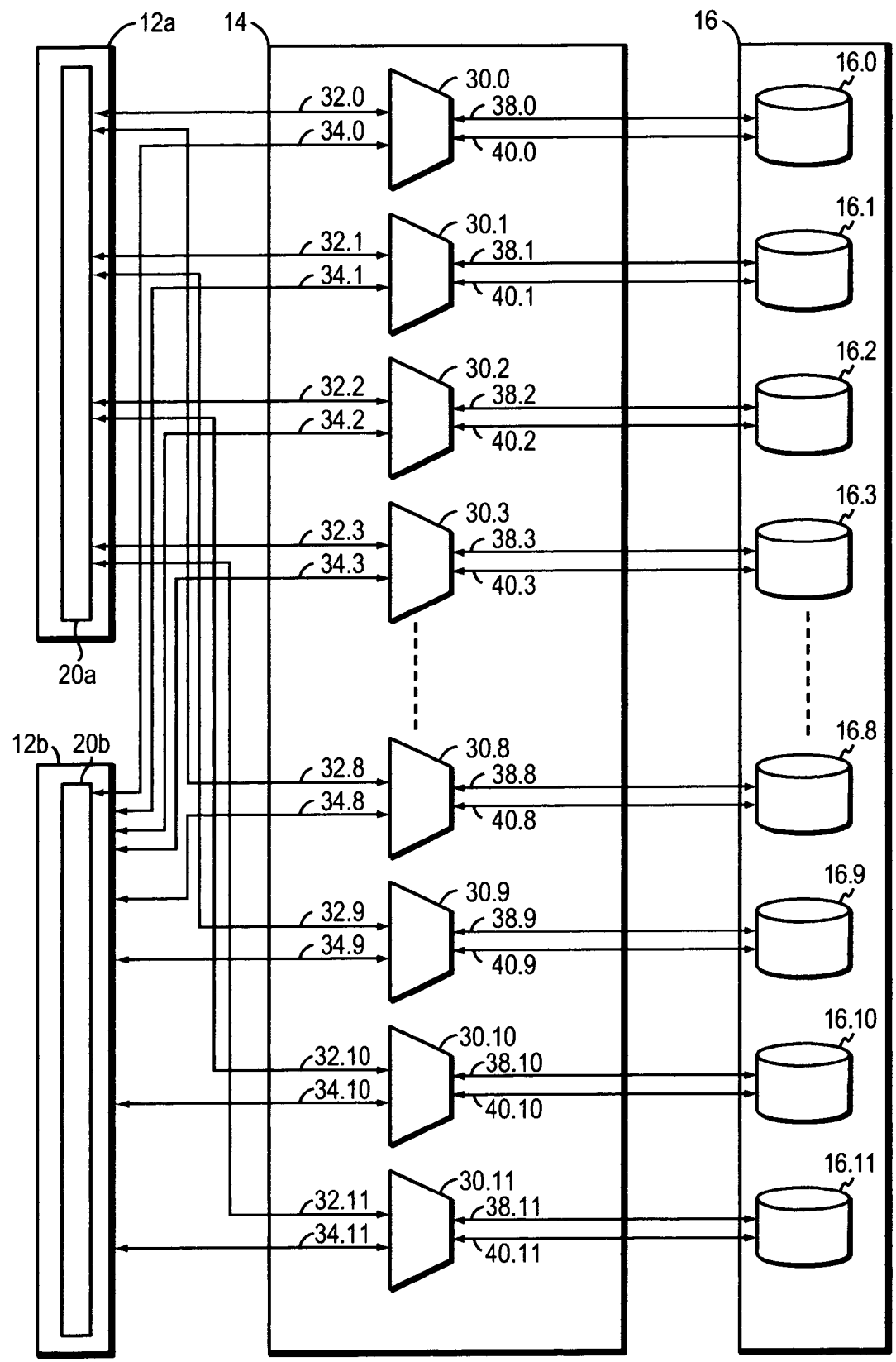
FIG. 13 is a schematic representation of a storage system like that of FIG. 1 wherein the midplane employs a multiplexing device of FIGS. 9 and 11 for each disk drive installed in the system, so that the storage processors can communicate with either a SAS or SATA disk drive on a slot-by-slot basis.

In FIG. 12 there is shown the system 10 implementing the multiplexing device 30 of the invention. Each storage processor 12a,b transfers either single ported or dual ported data signals over the sdata/A and sdata/B system port signals, depending upon which type of device is being accessed. The storage processor 12a is connected via the 12 sdata/A signals 32.0-32.11 to the multiplexing devices 30.0-30.11 respectively. Likewise, the storage processor 12b is connected via the 12 sdata/B signals 34.0-34.11 to the multiplexing devices 30.0-30.11 respectively. The sdata/C_1 and sdata/C_2 device port signals of the 12 multiplexing devices 30, 38.0-38.11 and 40.0-40.11 are coupled to the disk drives 16.0-16.11 respectively. Each disk drive 16.0-16.11 drives a drive type signal 36.0-36.11 to the multiplexing devices 30.0-30.11 (8 drives and multiplexers shown). For each drive 16, if the drive is a single ported drive, the signal 38 is coupled to the drive 16 and the signal 40 is not connected. If the drive is a dual ported drive, both signals 38 and 40 are coupled to the drive 16. It is thus seen that each of the 12 drives 16.0-16.11 may be either a single ported drive or a dual ported drive. In FIG. 13 there is shown the system 12 implementing the multiplexing device 30 of the invention wherein the single ported devices are SATA disk drives and the dual ported devices are SAS disk drives. This embodiment is functionally the same as that of FIG. 12 except that FIG. 13 takes advantage of the SAS/SATA protocol to generate the drive_type select signal 36 internal to the multiplexer 30 as previously described.

The present invention is not to be limited in scope by the specific embodiments described herein. Various modifications of the present invention, in addition to those described herein, will be apparent to those of ordinary skill in the art from the foregoing description and accompanying drawings. Though a storage system is presented herein as an example implementation of the multiplexing device, the multiplexing device of the invention can in fact be used in any system that requires support for both single and dual ported devices. For example, the multiplexing device of the invention can be used in a network system that supports either single or dual ported network adapters, or it can be used in a computing system that supports either single or dual ported I/O adapters. Furthermore, though the systems in the examples each support 12 disk drives, the formulas and other mechanisms of the invention clearly scale to any size storage system. In the storage system example shown, SAS and SATA drives are employed. It will be clear to the skilled artisan that the principles of the invention can be used with any types of dual ported and single ported drives. The multiplexing device of the invention is herein shown implemented on a midplane; however, one skilled in the art will understand that the multiplexing device may be implemented for example on a separately pluggable board coupled to the storage processors and/or disk drives, or on the storage processor modules, or on a cable assembly that couples the storage processors to the disk drives. Furthermore, several exemplary functional descriptions of the multiplexing device are provided. The preferred embodiment of the multiplexing device of the invention is described herein as incorporating an active/active multiplexer; however, one could incorporate an active/passive or passive/passive multiplexer instead. This implementation would not achieve the software advantages of the active/active multiplexer implementation, but it would realize the signal routing advantages of the invention in that the dual ported SAS signals would not need to be separately routed. One skilled in the art will understand that many specific implementations can be employed to achieve the logical functionality of the invention. All such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

I claim:

1. A multiplexing device coupled to a first system port, a second system port, a first device port, and a second device port, the multiplexing device for coupling to a target device, the multiplexing device comprising:
   an active multiplexer coupled to the first system port, the second system port, and a multiplexed port;
   bypass circuitry coupled to the first system port, the second system port, a first bypass port, and a second bypass port;
   the multiplexing device operable so that:
      when the multiplexing device is coupled via one of the first device port and the second device port to a target device that is a single ported device:
         the bypass circuitry is deactivated and the active multiplexer is activated to multiplex been the first system port and the second system port, and the multiplexed port;
         the multiplexed port is coupled to the one of the first device port and the second device port; and
      when the multiplexing device is coupled via the first device port and the second device port to a target device that is a dual ported device:
         the active multiplexer is deactivated and the bypass circuitry is activated and the first bypass port and the second bypass port are coupled to the first device port and the second device port.

2. The multiplexing device of claim 1 wherein the single ported device is a disk drive.

3. The multiplexing device of claim 2 wherein the disk drive is a SATA disk drive.

4. The multiplexing device of claim 1 wherein the dual ported device is a disk drive.

5. The multiplexing device of claim 4 wherein the disk drive is a SAS disk drive.

6. The multiplexing device of claim 1 wherein the active multiplexer and the bypass circuitry also accept as input a select signal, and wherein the select signal is produced by the target device, and wherein:
   when the target device is a single ported device, the select signal is in a first state that causes activation of the multiplexer and deactivation of the bypass circuitry;
   when the target device is a dual ported device, the select signal is in a second state that causes deactivation of the multiplexer and activation of the bypass circuitry.

7. A storage system comprising:
   two storage processors;
   a plurality of disk drives, wherein each disk drive may be either a single ported or a dual ported disk drive;
   a corresponding plurality of multiplexing devices, each multiplexing device coupled to a first storage processor port, a second storage processor port, a first drive port, and a second drive port, each multiplexing device coupled to a disk drive and comprising:
      an active multiplexer coupled to the first storage processor port, the second storage processor port, and a multiplexed port;
      bypass circuitry coupled to the first storage processor port, the second storage processor port, a first bypass port, and a second bypass port; each multiplexing device operable such that:
         when the multiplexing device is coupled via one of the first drive port and the second drive port to a single ported disk drive, the bypass circuitry is deactivated and the active multiplexer is activated to multiplex between the first storage processor port and the second storage processor port and the multiplexed port, and the multiplexed port is coupled to the one of the first drive port and the second drive port; and
         when the multiplexing device is coupled via the first drive port and the second drive port to a dual ported disk drive, the active multiplexer is deactivated and the bypass circuitry is activated and the first bypass port and the second bypass port are coupled to the first drive port and the second drive port.

8. The storage system of claim 7 wherein the single ported disk drive is a SATA disk drive.

9. The storage system of claim 7 wherein the dual ported disk drive is a SAS disk drive.

10. The storage system of claim 7 wherein the active multiplexer and the bypass circuitry also accept as input a select signal, and wherein the select signal is produced by the disk drive, and wherein:
    when the disk drive is a single ported disk drive, the select signal is in a first state that causes activation of the multiplexer and deactivation of the bypass circuitry;
    when the disk drive is a dual ported disk drive, the select signal is in a second state that causes deactivation of the multiplexer and activation of the bypass circuitry.

11. A method for communicating been a system and a target device that may be either a single ported or a dual ported target device, comprising the steps of:
    providing a multiplexing device, each multiplexing device coupled to a first system port and a second system port, each multiplexing device also coupled to a first device port and a second device port, the multiplexing device comprising an active multiplexer and bypass circuitry;
    coupling the active multiplexer to the first system port, the second system port and to a multiplexed port;
    coupling the bypass circuitry to the first system port and the second system port;

when the multiplexing device is coupled via one of the first device port and the second device port to a target device that is a single ported device:
deactivating the bypass circuitry and activating the multiplexer to multiplex between the first system port and the second system port, and the multiplexed port;
coupling the multiplexed port to the one of the first device port and the second device port;
when the multiplexing device is coupled via the first device port and the second device port to a target device that is a dual ported device:
deactivating the active multiplexer;
activating the bypass circuitry to produce a first bypass port and a second bypass port;
coupling the first bypass port and the second bypass port to the device signals.

12. The method claim 11 wherein the single ported device is a disk drive.

13. The method of claim 12 wherein the disk drive is a SATA disk drive.

14. The method of claim 11 wherein the dual ported device is a disk drive.

15. The method of claim 14 wherein the disk drive is a SAS disk drive.

16. The method of claim 11 further comprising the steps of:
accepting as input by the active multiplexer and the bypass circuitry a select signal, wherein the select signal is produced by the target device;
when the target device is a single ported device, placing the select signal in a first state that causes activation of the multiplexer and deactivation of the bypass circuitry;
when the target device is a dual ported device, placing the select signal in a second state that causes deactivation of the multiplexer and activation of the bypass circuitry.

17. A method for use in a storage system, the method comprising the steps of:
providing a plurality of multiplexing devices, each multiplexing device coupled to a first storage processor and a second storage processor via corresponding a first storage processor port and a second storage processor port, each multiplexing device also coupled to a first device port and a second device port;
each multiplexing device comprising an active multiplexer and bypass circuitry;
the active multiplexer coupled to the first storage processor port, the second storage processor port, and a multiplexed port;
the bypass circuitry coupled to the first storage processor port, the second storage processor port, a first bypass port, and a second bypass port;
when the multiplexing device is coupled via one of the first device port and the second device port to a single ported disk drive:
deactivating the bypass circuitry and activating the multiplexer to multiplex between the first storage processor port, the second storage processor port, and the multiplexed port;
coupling the multiplexed port to the one of the first device port and the second device port;
when the multiplexing device is coupled via the first device port and the second device port to a dual ported disk drive:
deactivating the active multiplexer;
activating the bypass circuitry;
coupling the first bypass port and the second bypass port to the first device port and the second device port.

18. The method of claim 17 wherein the single ported disk drive is a SATA disk drive.

19. The method of claim 17 wherein the dual ported disk drive is a SAS disk drive.

20. The method of claim 17 further comprising the steps of:
for each multiplexing device, accepting as input by the active multiplexer and the bypass circuitry a select signal, wherein the select signal is produced by the disk drive;
when the multiplexing device is coupled to a single ported disk drive, placing the select signal in a first state that causes activation of the multiplexer and deactivation of the bypass circuitry;
when the multiplexing device is coupled to a dual ported disk drive, placing the select signal in a second state that causes deactivation of the multiplexer and activation of the bypass circuitry.

21. The multiplexing device of claim 1 wherein:
when the multiplexing device is coupled via one of the first device port and the second device port to a target device that is a single ported device, the multiplexing device is configured to receive a signal having a first logical state, and in response to the signal having the first logical state, deactivate the bypass circuitry and activate the active multiplexer to multiplex been the first system port and the second system port and the multiplexed port; and
when the multiplexing device is coupled via the first device port and the second device port to a target device that is a dual ported device, the multiplexing device is configured to receive a signal having a second logical state, the second logical state being distinct from the first logical state, and in response to the signal having the second logical state, deactivate the active multiplexer and activate the bypass circuitry to couple the first bypass port and the second bypass port to the first device port and the second device port.

22. The storage system of claim 7 wherein:
when the multiplexing device is coupled via one of the first device port and the second device port to a target device that is a single ported device, the multiplexing device is configured to receive a signal having a first logical state, and in response to the signal having the first logical state, deactivate the bypass circuitry and activate the active multiplexer to multiplex been the first system port and the second system port and the multiplexed port; and
when the multiplexing device is coupled via the first device port and the second device port to a target device that is a dual ported device, the multiplexing device is configured to receive a signal having a second logical state, the second logical state being distinct from the first logical state, and in response to the signal having the second logical state, deactivate the active multiplexer and activate the bypass circuitry to couple the first bypass port and the second bypass port to the first device port and the second device port.

23. The method of claim 11 wherein:
when the multiplexing device is coupled via one of the first device port and the second device port to a target device that is a single ported device, receiving a signal having a first logical state, and in response to the signal having the first logical state, deactivating the bypass circuitry and activating the active multiplexer to multiplex been the first system port and the second system port and the multiplexed port; and
when the multiplexing device is coupled via the first device port and the second device port to a target device that is a dual ported device, receiving a signal having a second logical state, the second logical state being distinct from the first logical state, and in response to the signal having the second logical state, deactivating the active multiplexer and activating the bypass circuitry to couple the first bypass port and the second bypass port to the first device port and the second device port.

24. The method of claim 17 wherein:

when the multiplexing device is coupled via one of the first device port and the second device port to a target device that is a single ported device, receiving a signal having a first logical state, and in response to the signal having the first logical state, deactivating the bypass circuitry and activating the active multiplexer to multiplex been the first system port and the second system port and the multiplexed port; and when the multiplexing device is coupled via the first device port and the second device port to a target device that is a dual ported device, receiving a signal having a second logical state, the second logical state being distinct from the first logical state, and in response to the signal having the second logical state, deactivating the active multiplexer and activating the bypass circuitry to couple the first bypass port and the second bypass port to the first device port and the second device port.

* * * * *

UNITED STATES PATENT AND TRADEMARK OFFICE
CERTIFICATE OF CORRECTION

PATENT NO.        : 7,472,210 B2  
APPLICATION NO.   : 11/167884  
DATED             : December 30, 2008  
INVENTOR(S)       : Douglas E. Peeke Page 1 of 1

It is certified that error appears in the above-identified patent and that said Letters Patent is hereby corrected as shown below:

Claim 1, Column 7, Line 48, "been" should read --between--.  
Claim 23, Column 10, Line 62, "been" should read --between--.  
Claim 24, Column 12, Line 1, "been" should read --between--.

Signed and Sealed this

Twenty-fourth Day of February, 2009

JOHN DOLL  
*Acting Director of the United States Patent and Trademark Office*